United States Patent
Loske et al.

(10) Patent No.: US 12,051,251 B2
(45) Date of Patent: Jul. 30, 2024

(54) METHOD FOR IDENTIFYING INDUSTRIAL CONNECTORS

(71) Applicant: HARTING Electric Stiftung & Co. KG, Espelkamp (DE)

(72) Inventors: Felix Loske, Minden (DE); Oliver Beyer, Herford (DE)

(73) Assignee: HARTING Electric Stiftung & Co. KG, Espelkamp (DE)

( * ) Notice: Subject to any disclaimer, the term of this patent is extended or adjusted under 35 U.S.C. 154(b) by 0 days.

(21) Appl. No.: 17/766,723

(22) PCT Filed: Nov. 25, 2020

(86) PCT No.: PCT/DE2020/100998
§ 371 (c)(1),
(2) Date: Apr. 5, 2022

(87) PCT Pub. No.: WO2021/110207
PCT Pub. Date: Jun. 10, 2021

(65) Prior Publication Data
US 2024/0062559 A1    Feb. 22, 2024

(30) Foreign Application Priority Data

Dec. 5, 2019    (DE) .................... 10 2019 133 192.7

(51) Int. Cl.
*G06K 9/00*    (2022.01)
*G06Q 30/015*    (2023.01)
(Continued)

(52) U.S. Cl.
CPC .......... *G06V 20/60* (2022.01); *G06Q 30/015* (2023.01); *G06T 7/60* (2013.01); *G06V 10/40* (2022.01)

(58) Field of Classification Search
CPC .......... G06V 20/60; G06V 10/40; G06T 7/60
See application file for complete search history.

(56) References Cited

U.S. PATENT DOCUMENTS

2014/0302694 A1    10/2014    Qiao et al.
2019/0130214 A1    5/2019     Sivakumar et al.
(Continued)

FOREIGN PATENT DOCUMENTS

DE    19953592 A1    8/2000
DE    10152851 A1    5/2003
(Continued)

OTHER PUBLICATIONS

Vision-based adaptive stereo measurement of pins on multi-type electrical connectors, Delong Zhao et al., Aug. 8, 2019, pp. 1-18 (Year: 2019).*

(Continued)

*Primary Examiner* — Jayesh A Patel
(74) *Attorney, Agent, or Firm* — Smartpat PLC

(57) ABSTRACT

In order for a supplier of connectors to reduce personnel costs and to guarantee customers a consistently high quality standard promptly and reliably, even for global data traffic, a method for identifying connectors, comprising the following steps, is proposed: a. automatic identification of components (10, 2, 3, 3', 3") of an industrial connector (1), from at least one image file; b. analysis of the geometric relationships and/or functional connections between the components (10, 2, 3, 3', 3"); c. extraction of individual characteristics of the components (10, 2, 3, 3', 3") from the image file using information obtained in step b.

16 Claims, 1 Drawing Sheet

(51) Int. Cl.
  G06T 7/60    (2017.01)
  G06V 10/40   (2022.01)
  G06V 20/60   (2022.01)

(56) References Cited

U.S. PATENT DOCUMENTS

2019/0251384 A1* 8/2019 Kreischer .............. G06F 18/211
2020/0388997 A1  12/2020 Bächler

FOREIGN PATENT DOCUMENTS

| DE | 212012000216 | U1 |   | 7/2014  |            |
|----|--------------|----|---|---------|------------|
| DE | 102017011421 | B3 |   | 6/2019  |            |
| EP |    3096413   | A1 | * | 11/2016 | H01R 12/7023 |
| EP |    3096413   | A1 |   | 11/2016 |            |
| EP |    3477549   | A1 |   | 5/2019  |            |
| WO |   2004105197 | A1 |   | 12/2004 |            |
| WO |   2019105502 | A1 |   | 6/2019  |            |

OTHER PUBLICATIONS

Research on Recognition Method of Electrical Components Based on YOLO V3, Haipeng Chen et al, IEEE, Sep. 2019, pp. 157818-157829 (Year: 2019).*

Delock, Datasheet "ATX Kabel 24-polig Stecker zu 20-polig Buchse," unknown publication date, retrieved from www.delock.de/files/9300. download&usg=AOvVaw0eNlacfZzsR79Y1NUpsiQ1 on Oct. 29, 2021.

Defects and Components Recognition in Printed Circuit Boards Using Convolutional Neural Network, Authors: Cheong Leong Kean Suandi Shahrel, Rahman Saimunur, Publication data: 10th International Conference on Robotics, Vision, Signal Processing and Power Applications, Apr. 22, 2019,Springer, Source info: pp. 75-81.

Research and Discussion on Image Recognition and Classification Algorithm Based on Deep Learning, Authors: Dong Yu-nan, Liang Guang-sheng, Publication data: 2019 International Conference on Machine Learning, Big Data and Business Intelligence (MLBDBI),,Nov. 8, 2019, IEEE, Source info: pp. 274-278.

Research on Recognition Method of Electrical Components Based on YOLO V3, Authors: Chen Haipeng, He Zhentao, Shi Bowen, Zhong Tie, Publication data: IEEE Access, IEEE, USA, Source info: vol. 7, pp. 157818-157829.

Zhao, D. [et al.]: Vision-based adaptive stereo measurement of pins on multi-type electrical connectors. In: Measurement Science and Technology, 2019, 30. Jg., Nr. 10, S. 105002.URL: https://iopscience. iop.org/article/10.1088/1361-6501/ab198f/pdf, retrieved Dec. 9, 2020.

* cited by examiner

METHOD FOR IDENTIFYING INDUSTRIAL CONNECTORS

TECHNICAL FIELD

The disclosure provides a method for identifying industrial plug-in connectors.

BACKGROUND

Methods for identifying industrial plug-in connectors are needed by plug-in connector suppliers in order to answer product-specific customer questions and, if necessary, to create suitable offers for the respective customer as a result. Customer inquiries usually relate to plug-in connector systems that the customer already has and corresponding compatibilities, i.e. the same or alternative structural elements that match the plug-in system and have the same or different functional categories. By way of non-limiting example, functional categories may be: electrical energy transmission, electronic signal transmission (analog and digital), optical and optoelectronic signal transmission, pneumatics, e.g. air pressure transmission, and additionally also metrology, e.g. heat measurement, oscillation/vibration/sound measurement and in particular current/voltage/electrical energy sensing, motion measurement, light measurement (photometric quantities) and in addition also data technology, e.g. digital electronic data storage modules, switches, decentralized computer units.

In the prior art, it is common for plug-in connector suppliers to receive, analyze and respond to customer inquiries in the form of visual media, e.g. digital photos, image files, etc.

Such inquiries are currently answered manually and individually by experienced employees of the plug-in connector supplier.

A disadvantage of this prior art is that these methods are expensive and person-dependent, and this sometimes results in undesirable waiting times for the customer, particularly in international goods and data traffic. If such an employee leaves the company, they must record their knowledge in writing and/or train a colleague or the corresponding knowledge may be lost for the company. Furthermore, a consistent standard of quality is thereby jeopardized.

SUMMARY

An object of the disclosure is to present a method for identifying industrial plug-in connectors, which saves a plug-in connector supplier personnel costs and guarantees its customers a consistently high standard of quality in a quick and reliable manner, even in global data traffic.

This object is solved by the features of the independent claims.

Advantageous configurations of the invention are specified in the dependent claims.

One method is used to identify industrial plug-in connectors and includes the following steps:
 a. automatically identifying structural elements of an industrial plug-in connector from at least one image file;
 b. analyzing the geometric and/or functional relationships between the structural elements;
 c. extracting individual features of the structural elements from the image file using information obtained from step b.

This is particularly advantageous because this method can be carried out automatically and without manual, i.e. human, intervention. Irrespective of the time of day and date, inquiries from all over the world can be processed immediately, competently and with a consistently high level of quality by a computer program that runs, for example, in-house on a computation server or else advantageously, with little maintenance effort, in a cloud application. For this purpose, the computation server can have at least one microprocessor and a combined program/data memory. The method can be stored in the data memory as part of the computer program.

Furthermore, the method has the advantage that the identification of the structural elements can be used to monitor the assembly process of the plug-in connector. It is thus easy to check whether the components are put together appropriately and correctly. For example in the case of automatic assembly, fitting and/or installation, this advantageously enables quality assurance that is also automatic.

It has proven to be particularly advantageous for method step c to take place using information obtained from step b. Finally, special knowledge about plug-in connector systems can thus be taken into account in the method, for example with regard to coding, memberships of systems, dimensions, etc., which must be fulfilled so that the components fit together. This knowledge may have been introduced into the method beforehand, i.e. even prior to method step a, by programming of the computer program by or with the support of a person skilled in the art.

For this purpose, method step a can advantageously comprise at least the following two sub-steps:
 a1. automatically visually recognizing the structural elements as individual objects using artificial intelligence (AI);
 a2. assigning the structural elements to component categories of the plug-in connection.

These two method steps a1 and a2 can sometimes also be executed, for example by suitable software, in reverse order and/or together, i.e. essentially simultaneously, in method step a, which comprises both method steps. In the latter case, not only does step a1 affect step a2, but step a2 also affects step a1 in return, in that the visual recognition is also improved by the possible assignment. The AI is therefore better able to separate an individual component as such when it increasingly understands which component category it could possibly relate to. Both visual recognition and programmed knowledge and/or self-learned experience therefore play an important role in the method.

Optionally, in method step a2, the recognized structural elements can additionally be assigned to at least one functional category.

To enable sub-step a1, the system can be "trained" manually, i.e. by human activity, beforehand, i.e. even prior to method step a, to recognize and characterize the structural elements. Not only structural element categories, such as e.g. "plug-in connector housing", "contact insert", "plug-in connector modular frame", "plug-in connector modules" are included in the training, but specific type designations can also be assigned for a previously made selection of the structural elements. These assignments are made according to the categories previously taught to the system when training its artificial intelligence (AI).

For this purpose, using artificial intelligence (AI), the system learns beforehand from manually created training tables in connection with training images. As a result of this learning process, the system is then able, in said method step a2, for newly added image files—or defined parts thereof— to independently assign the structural elements found therein to these structural element categories.

For this purpose, said training is therefore first carried out manually, chronologically even prior to carrying out method step a.

Although this initially requires manual, i.e. human, effort, this is in principle only necessary once and the method can then be used as often as desired, inexpensively and at any time.

The training includes the process of first reading in a large number of training images and manually assigning the respective structural element categories to the associated training images, e.g. by means of training tables.

The assignment can then take place by assigning one row in the training table per structural element to each training image. In addition to the column for the referenced training image, the training table also contains a column for the structural element category and four columns that precisely describe the exact position of the structural element in the X and Y axes and the height and width thereof in the image.

For example, a training image shows a particular contact insert. The contact insert has a designation, for example "Han A—Quicklock connector" and/or an article number, for example "09 20 003 2633". The training table then has exactly one line for the training image-structural element combination, containing, for example, the entry "Image4711" for the training image, "Han A—Quicklock connector" or "09 20 003 2633" for the structural element, and the position information, for example the numerical values "54, 110, 150, 75" for the XY position, and also the height and width of the structural element. The identifier, position and dimension (height/width) were entered manually beforehand by a person skilled in the art. If article numbers are used, it can be particularly advantageous if they are maintained systematically, i.e. components that differ only slightly also have article numbers that are somewhat similar to one another, e.g. differ only in their last digit or several last digits. In this case, the training table can optionally also be provided with shortened article numbers, or the AI can make a rough assignment in some other way. In a further preferred configuration, an article number of a structural element can also be used as a proxy for similar structural elements in order to achieve a somewhat coarser rasterization and thus a meaningful assignment. For example, in this way, different contact inserts that differ only in the color of their cable connection actuator can be assigned to a common structural element category despite their minimal difference.

As part of the training, using a large number of training images, the AI adjusts the weights of its neural connections in such a way that it is able to determine the structural elements located on the images, as well as the position and dimension thereof. The AI is able to independently extract features relevant for the determination (such as edges, textures, etc.) and can thus in the same way, even beyond the training, identify unknown images containing the structural elements included in the training. Of course, this principle can also be applied in the same way to any other visual indicator via a training table. In particular, a statistical evaluation is useful in which the visual indicators of each individual training image can be viewed as a so-called "sample", i.e. as a random selection of data from the totality of features relating to the respective feature.

In method step a, all the structural elements known to the AI can then be identified (i.e. assigned to a known category, such as "plug-in connector housing") from any image files, for example image files originating from customer inquiries, and localized.

Alternatively or additionally, the objects can however also be assigned to specific structural forms in the same way. If, therefore, the component category training is tailored to very specific products, i.e. not just, for example, to "plug-in connector housing" or "contact insert" in general but, as described in the example above, to "Han A—Quicklock connector"/article number "09 20 003 2633", the objects to be analyzed are then assigned to precisely these component categories.

Alternatively or additionally, the training can however also relate to specific, known features of the respective structural elements.

As has been shown in numerous trials and test runs, this principle sometimes also works very well for features that a person skilled in the art would not initially expect for plug-in connectors. For example, the AI can also, inter alia, be trained with regard to material and/or manufacturing process. This is then expediently done using training images that correspond to the manufacturing process and materials used in the respective field. For this purpose, the objects shown on the training images do not necessarily have to show components that come from the field of plug-in connectors, but rather they only have to have the corresponding production- and material-specific properties. Alternatively, the AI can however also be implemented exclusively with training images of components from the field of plug-in connectors and in particular specifically with the relevant components, e.g. plug-in connector housings, but with the focus of the features then being on the material and the manufacturing process. More specifically, the training can be empirically adapted to the respective successful learning experience that is to be checked manually.

In a very special configuration, it is thus also possible, for example, to subsequently assign the objects identified in a first step as "plug-in connector housings" to the corresponding material and/or manufacturing process, e.g. zinc alloy, die-casting process or even the zinc die-casting process, and thus to make a pre-selection, from which a final product-specific assignment takes place in a third step.

The above methods can thus be used to identify structural elements shown in an image or in several images, e.g. plug-in connector housings contact inserts ("insulating bodies").

The plug-in connector housings can furthermore also be functionally classified as hoods, attachment housings and socket housings. Alternatively or additionally, they can be assigned according to material and manufacturing process, but alternatively or additionally also to specific products.

Furthermore, the plug-in connector housing may be characterized by one or more of the following features:
- presence and, if applicable, type and form of a cable gland;
- type and form of a housing locking arrangement;
- type and form of a seal;
- presence and, if applicable, type of coding and/or polarization apparatus thereof; geometric dimensions of the plug-in connector housing, and the material and/or manufacturing process thereof;
- presence and, if applicable, type and form of a PE (Protective Earth) element;
- presence and, if applicable, number and form of one or more PE bridges.

In a further preferred configuration, the contact inserts may be characterized by at least one of the following features:
- the size and geometric shape thereof;
- at least one functional category;
- presence and, if applicable, type and form of a PE (Protective Earth) element.

The functional category may comprise at least one of the following characteristics:
- electrical energy transmission,
- analog and/or digital electronic signal transmission,
- optical and/or optoelectronic signal transmission,
- pneumatics, e.g. air pressure transmission.

The following component categories may additionally also be available for method step A2:
- plug-in connector modules,
- plug-in connector modular frames.

The plug-in connector modules are furthermore characterized by at least one of the following features:
- the geometric dimensions thereof;
- the functional category thereof;
- type and form of the latch thereof.

The functional category may be formed by one of the following features:
- electrical energy transmission;
- analog and/or digital electronic signal transmission;
- optical and optoelectronic signal transmission;
- pneumatics, e.g. air pressure transmission;
- metrology;
- data technology.

The abovementioned functional category "metrology" may further comprise at least one of the following subcategories:
- heat measurement;
- oscillation and/or sound and vibration measurement;
- current sensing;
- voltage measurement;
- electrical energy measurement;
- light measurement (photometric quantities);
- translational and/or rotational speed measurement.

The abovementioned functional category "data technology" may further comprise at least one of the following subcategories:
- digital electronic data storage;
- data distribution (e.g. switches);
- data processing (e.g. decentralized computer units).

Furthermore, a plug-in connector module frame may be characterized by at least one of the following features:
- number of plug-in slots thereof;
- type and form of the mechanism thereof for accommodating and securing the plug-in connector modules;
- stability/suitability for pneumatics;
- the material thereof (e.g. metal or plastic) and/or the manufacturing process thereof;
- presence and, if applicable, type and form of the PE earthing thereof.

In particular, the method can combine in the abovementioned manner artificial intelligence (AI)-based automatic visual recognition (typically by means of "convolutional neural networks (CNNs)" with subsequent algorithmic image processing.

The learning process and the analysis of individual components are advantageously carried out taking into account the physical structure of other components of the plug-in connector system and in particular of the entire plug-in connector system. Starting from a digital image of a plug-in connector, the proposed process can thus be used to identify, for example, the plug-in connector housing, the plug-in connector modular frame and the inserts particularly precisely and to describe them geometrically in particular according to their functional relationship to one another. A hierarchical description of the plug-in connector system is made possible by the advantageous sequential processing chain of plug-in connector identification and algorithmic analysis.

It is particularly advantageous here that qualitative assignments and comparisons are possible, which could not be reproduced in the prior art with existing automatic recognition. The method is characterized in particular by the combination of artificial intelligence (AI)-based automatic visual recognition, for example by means of "convolutional neural networks" (CNNs), and the subsequent algorithmic image processing, taking into account the physical structure of a plug-in connector system, i.e. the functional and geometric interrelationship.

BRIEF DESCRIPTION OF THE DRAWINGS

A preferred exemplary embodiment of the invention is illustrated and explained in more detail below with reference to a drawing. For this purpose, a system for identifying an industrial plug-in connector from a digital image file is presented.

DETAILED DESCRIPTION

Figure 1:
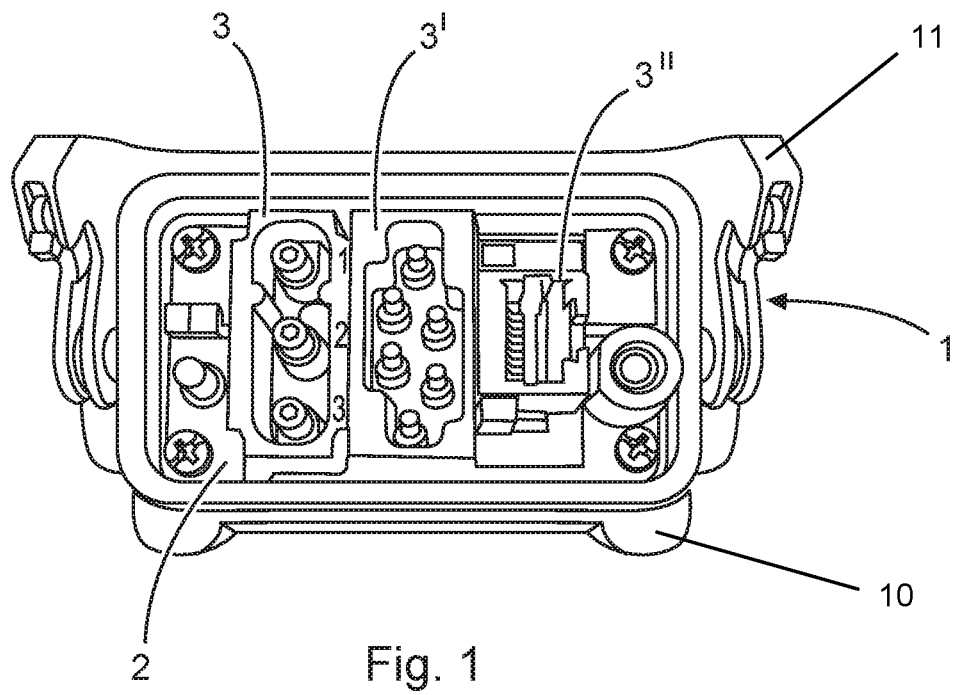
FIG. 1 shows an image to be analyzed of a plug-in connector to be identified.

FIG. 1 shows an image to be analyzed of a plug-in connector 1 to be identified. The figure shows in detail an attachment housing 10 with a locking clip 11. A plug-in connector modular frame 2 is screwed into the attachment housing 10. Several plug-in connector modules 3, 3', 3" are fastened therein, two of which 3, 3' are used for electrical energy transmission and one 3" for electrical signal transmission.

Figure 2:
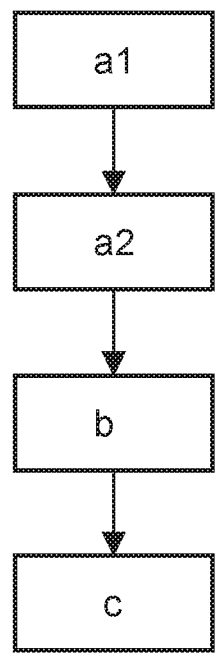
FIG. 2 shows a flowchart of a method for identifying the structural elements from a digital image file belonging to the image.

FIG. 2 shows a flowchart of a method for automatically identifying the industrial plug-in connector 1 from this image file.

The method is carried out using a computer program on a computation server and comprises the following steps:
a. automatically identifying the structural elements 10, 2, 3, 3', 3" of the industrial plug-in connector 1 from the image file, through automatic visual recognition and assignment of the structural elements 10, 2, 3, 3', 3" as individual objects using artificial intelligence (AI);
b. analyzing the geometric and/or functional relationships between the individual structural elements 10, 2, 3, 3', 3";
c. extracting individual features of the structural elements from the image file using information obtained from step b.

In the present embodiment, method step a is further subdivided into method step a1 and method step a2.

In method step a1, the following structural elements are first separated from one another, i.e. recognized as different objects, by means of what is known as a "convolutional neural network" (CNN). In method step a2, they are assigned to the various component categories.

In method step a (i.e. in a1 in combination with a2), on the basis of training prior to the method, the system therefore recognizes the following:
- one first object 10, from the "plug-in connector housing" category;
- one second object 2, from the "plug-in connector modular frame" category;
- three third objects 3, 3', 3", from the "plug-in connector module" category.

Depending on the type of prior training, the objects can however also be assigned to specific products, namely the product designations and/or article numbers thereof.

In method step b, the program first recognizes the geometric relationships, namely that the plug-in connector modules are enclosed by the plug-in connector modular frame and that the plug-in connector modular frame is enclosed by the plug-in connector housing. Using its programmed knowledge, the program concludes from this that
1. the plug-in connector modules 3, 3', 3" are fastened in the plug-in connector modular frame 2, i.e. held in it, and that
2. the plug-in connector modular frame 2 is fastened in the plug-in connector housing, and that
3. the plug-in connector modules 3, 3', 3" are compatible with the plug-in connector modular frame 2 and the plug-in connector modular frame 2 is compatible with the housing 10, respectively.

In a further embodiment, these two method steps a1 and a2 are executed by suitable software together, i.e. essentially simultaneously, in method step a, which comprises both method steps. This is because step a2 also affects step a1 in return in that the visual recognition is already improved by the possible assignment. The AI is therefore better able to separate an individual component as such when it increasingly understands which component category it could possibly relate to. Both visual recognition and programmed knowledge and/or self-learned experience therefore play an important role in the method.

Optionally, in method step a2, the recognized structural elements can additionally be assigned to at least one functional category.

In method step c, further individual features of the structural elements 10, 2, 3, 3', 3" are identified. This includes whether the plug-in connector modular frame 2 and/or the plug-in connector housing have what is known as a "Protective Earth" (PE)—i.e. protective earthing contact—and, if applicable, what type of protective earthing contact this is, what material the plug-in connector modular frame is made of, and what height-width ratio the structural elements 10, 2, 3, 3', 3" have. Across components, it can be concluded that the dimensions and the coding of the structural elements 10, 2, 3, 3', 3" that are respectively connected to one another match one another.

According to the same principles, other visual/geometric features such as for locking the housing, sealing, coding, the exact configuration of the PE element of the housing or of the frame can be derived in accordance with their hierarchy. The algorithmic image processing involves particular physical features, such as e.g. repeated arrangements, fixed relationships in terms of frame length to frame width, number and dimension of the modules of a plug-in connector system.

LIST OF REFERENCE SIGNS

1 Plug-in connector
10 Plug-in connector housing
2 Plug-in connector modular frame
3, 3', 3" Plug-in connector modules

The invention claimed is:

1. A method for identifying industrial plug-in connectors, comprising the following steps:
   receiving an image file of an industrial plug-in connector (1);
   automatically identifying, by a convolutional neural network, a plug-in connector housing (10), a plug-in connector modular frame (2), and plug-in connector modules (3, 3', 3") of the industrial plug-in connector (1) from the image file;
   analyzing geometric and functional relationships between the plug-in connector housing (10), the plug-in connector modular frame (2), and the plug-in connector modules (3, 3', 3"); and
   extracting individual features of the plug-in connector housing (10), the plug-in connector modular frame (2), and the plug-in connector modules (3, 3', 3") from the image file using information obtained by analyzing the geometric and functional relationships.

2. The method as claimed in claim 1,
   wherein automatically identifying the plug-in connector housing (10), the plug-in connector modular frame (2), and the plug-in connector modules (3, 3', 3") comprises
   automatically visually recognizing the plug-in connector housing (10), the plug-in connector modular frame (2), and the plug-in connector modules (3, 3', 3") as individual objects and
   assigning the individual objects to component categories.

3. The method as claimed in claim 2, wherein the convolutional neural network has been trained to recognize and characterize
   plug-in connector housings and
   contact inserts having insulating bodies.

4. The method as claimed in claim 3, wherein extracting individual features of the plug-in connector housing (10) includes the following features:
   hood;
   attachment housing; and
   socket housing.

5. The method as claimed in claim 3, wherein extracting individual features of the plug-in connector housing (10) includes the following features:
   type and form of a cable gland;
   type and form of a housing locking arrangement;
   type and form of a seal;
   type of coding and polarization of the plug-in connector housing;
   geometric dimensions of the plug-in connector housing;
   material and manufacturing process of the plug-in connector housing;
   type and form of a PE (Protective Earth) element; and
   number and form of one or more PE bridges.

6. The method as claimed in claim 3, wherein extracting individual features of the contact inserts includes the following features:
   a size and geometric shape of each contact insert in the image file;
   a functional category of each contact insert in the image file;
   type and form of a PE (Protective Earth) element of each contact insert in the image file.-

7. The method as claimed in claim 6, wherein the functional category comprises the following categories:
electrical energy transmission,
analog or digital electronic signal transmission,
optical and optoelectronic signal transmission,
pneumatics.

8. The method as claimed in claim 3, wherein the component categories further include:
plug-in connector modules,
plug-in connector modular frames.

9. The method as claimed in claim 8,
wherein extracting individual features of the plug-in connector modules includes extracting
geometric dimensions of the plug-in connector modules;
a functional category of each plug-in connector module;
type and form of a latch of each plug-in connector module.

10. The method as claimed in claim 9, wherein the plug-in connector modules (3, 3', 3") are assigned to at least one of the following functional categories:
electrical energy transmission;
analog or digital electronic signal transmission;
optical and optoelectronic signal transmission;
pneumatics;
metrology;
data technology.

11. The method as claimed in claim 10, wherein the functional category "metrology" comprises at least one of the following subcategories:
heat measurement;
oscillation or sound and vibration measurement;
current sensing;
voltage measurement;
electrical energy measurement;
light measurement (photometric quantities);
translational or rotational speed measurement.

12. The method as claimed in claim 10, wherein the functional category "data technology" comprises at least one of the following subcategories:
digital electronic data storage;
data distribution;
data processing.

13. The method as claimed in claim 7, wherein the plug-in connector modular frame (2) is characterized by at least one of the following features:
number of plug-in slots thereof;
type and form of a mechanism thereof for accommodating and securing plug-in connector modules;
stability/suitability for pneumatics;
a material thereof and a manufacturing process thereof;
presence and, if applicable, type and form of the PE (Protective Earth) element thereof.

14. The method as claimed in claim 1, wherein article numbers are used as component categories.

15. The method as claimed in claim 1, wherein product designations are used as component categories.

16. A method for identifying industrial plug-in connectors, comprising:
receiving an image file of an industrial plug-in connector;
automatically identifying, by a convolutional neural network, a housing, a modular frame, and connector modules of the industrial plug-in connector as individual objects from the image file;
analyzing geometric and functional relationships between the housing, the modular frame, and the connector modules; and
using information obtained by analyzing the geometric and functional relationships between the housing, the modular frame, and the connector modules to extract
whether the housing is a hood, an attachment housing, or a socket housing,
type and form of a cable gland,
type and form of a housing locking arrangement,
type and form of a seal,
type of coding of the housing,
geometric dimensions of the housing,
material and manufacturing process of the housing,
number and form of protective earth bridges,
a size and geometric shape of each contact insert,
a functional category of each contact insert, and
type and form of a protective earth element of each contact insert.

* * * * *